United States Patent
George et al.

(10) Patent No.: US 7,024,471 B2
(45) Date of Patent: Apr. 4, 2006

(54) MECHANISM TO DYNAMICALLY UPDATE A WINDOWS SYSTEM WITH USER SPECIFIC APPLICATION ENABLEMENT SUPPORT FROM A HETEROGENEOUS SERVER ENVIRONMENT

(75) Inventors: Randy George, Austin, TX (US); Brian Keith Howe, Round Rock, TX (US); Chakkalamattam Jos Paul, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 09/735,588

(22) Filed: Dec. 12, 2000

(65) Prior Publication Data

US 2002/0107945 A1 Aug. 8, 2002

(51) Int. Cl.
*G06F 15/177* (2006.01)

(52) U.S. Cl. ............ 709/222; 709/203; 709/220; 709/228

(58) Field of Classification Search ............ 709/200, 709/203–205, 220–224, 227–228, 231; 717/168–178
See application file for complete search history.

(56) References Cited

U.S. PATENT DOCUMENTS

| 5,497,463 | A | * | 3/1996 | Stein et al. ............ 709/203 |
| 5,627,886 | A |   | 5/1997 | Bowman |
| 5,724,521 | A |   | 3/1998 | Dedrick |
| 5,784,563 | A |   | 7/1998 | Marshall et al. ............ 709/221 |
| 5,794,052 | A |   | 8/1998 | Harding |
| 5,828,887 | A |   | 10/1998 | Yeager et al. ............ 709/220 |
| 5,832,505 | A |   | 11/1998 | Kasso et al. ............ 707/104 |
| 5,920,725 | A | * | 7/1999 | Ma et al. ............ 717/171 |
| 5,960,204 | A |   | 9/1999 | Yinger et al. ............ 717/176 |
| 5,974,547 | A | * | 10/1999 | Klimenko ............ 709/217 |
| 5,999,740 | A |   | 12/1999 | Rowley ............ 717/173 |
| 6,026,438 | A |   | 2/2000 | Piazza et al. ............ 709/221 |
| 6,029,196 | A |   | 2/2000 | Lenz ............ 709/221 |
| 6,044,465 | A |   | 3/2000 | Dutcher et al. ............ 713/200 |
| 6,066,182 | A |   | 5/2000 | Wilde et al. |
| 6,074,434 | A | * | 6/2000 | Cole et al. ............ 717/173 |
| 6,091,411 | A | * | 7/2000 | Straub et al. ............ 715/747 |

(Continued)

OTHER PUBLICATIONS

"Understanding the value of IntelliMirror, emote OS Installation, and Systems Management Server", Microsoft, Jul., 1999, pp. 1-5.

(Continued)

*Primary Examiner*—Bharat Barot
(74) *Attorney, Agent, or Firm*—Duke W. Yee; Marilyn Smith Dawkins; Wing Yan Mok

(57) ABSTRACT

A method, apparatus and program for updating client computers with user specific application enablement are provided. The invention involves creating a component control file on a network server, which defines the actions to be performed to install an enablement component needed to run an application on a client and creating an installation control file which contains a list of the enablement components needed to run the set of applications that have been assigned to a user. The enablement components are changes to the operating system's configuration. When a user logs onto a client computer, a mechanism in the client reads the user's installation control file from the server and then installs the necessary enablement components on the client operating system, if those components are not already installed. In one embodiment, the user receives a prompt before the components are installed, in case the user does not want to use the entire set of assigned applications.

22 Claims, 3 Drawing Sheets

U.S. PATENT DOCUMENTS

| | | | |
|---|---|---|---|
| 6,105,063 A | 8/2000 | Hayes, Jr. | 709/223 |
| 6,151,643 A * | 11/2000 | Cheng et al. | 709/200 |
| 6,212,564 B1 | 4/2001 | Harter et al. | 709/228 |
| 6,272,545 B1 | 8/2001 | Flanagin et al. | |
| 6,389,589 B1 | 5/2002 | Mishra et al. | 717/11 |
| 6,418,466 B1 | 7/2002 | Bertram et al. | |
| 6,421,777 B1 * | 7/2002 | Pierre-Louis et al. | 713/2 |
| 6,446,260 B1 * | 9/2002 | Wilde et al. | 709/222 |
| 6,496,865 B1 * | 12/2002 | Sumsion et al. | 709/229 |
| 6,510,466 B1 * | 1/2003 | Cox et al. | 709/229 |
| 6,523,166 B1 | 2/2003 | Mishra et al. | |
| 6,574,618 B1 * | 6/2003 | Eylon et al. | 709/231 |
| 6,584,568 B1 | 6/2003 | Dircks et al. | |
| 6,654,032 B1 * | 11/2003 | Zhu et al. | 709/204 |
| 6,691,176 B1 * | 2/2004 | Narin et al. | 709/228 |
| 6,757,720 B1 | 6/2004 | Weschler, Jr. | 709/220 |
| 6,947,974 B1 * | 9/2005 | Mosbarger et al. | 709/217 |
| 2002/0123984 A1 | 9/2002 | Prakash | 707/1 |

OTHER PUBLICATIONS

Alistair et al., "Windows 2000 Active Directory, Chapter 8, Profiles and Group Policy Primer", O'Reilly Books, Jan. 2000, pp. 1-24. oreilly.com/catalog/win2000ads/chapter/ch08.html, retrieved Jul. 12, 2005.

"Organize and Classify Files Using Directories", Linfield College, Aug. 15, 1995, pp. 1-2, calvin.linfield.edu/~darnett/helpages/unix/basunx05.

* cited by examiner

MECHANISM TO DYNAMICALLY UPDATE A WINDOWS SYSTEM WITH USER SPECIFIC APPLICATION ENABLEMENT SUPPORT FROM A HETEROGENEOUS SERVER ENVIRONMENT

CROSS REFERENCE TO RELATED APPLICATIONS

The present application is related to co-pending U.S. patent applications Ser. No. 09/714,761 filed Nov. 16, 2000, and Ser. No. 09/714,760 filed Nov. 16, 2000. The above mentioned patent applications are assigned to the assignee of the present invention. The content of the cross referenced co-pending applications is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

1. Technical Field

The present invention relates to computer network environments. More specifically, the present invention relates to sharing software applications over a server.

2. Description of Related Art

In some computer network environments, system administrators will install applications on a server's shared file system for use by all users, rather than have the application installed on each client's hard drive. By sharing the application on a server, the administrator can improve overall manageability of the environment. The administrator can control which users have access to this application via access control to the shared file system. In addition, the administrator can control and easily upgrade the application with fixes or new support. When the shared application is updated, all users in the environment will be immediately affected by this change. Since all users execute the same level of the application, end user support is greatly improved.

However, many Windows applications cannot just be run from a shared file system. Many applications, when installed, require changes to the base operating system configuration. These changes can be updates to the system registry, files installed in an OS-specific location (e.g. Fonts) or updates to existing system files (e.g. Visual Basic Runtime DLL). Since the user does not install the application on their local system, for they are just executing the application from a share file system, these required operating system configuration changes are not made on the client being used. Thus, when the administrator provides a user access to an application on a server's share file system, the user will be unable to execute this application unless the client base system has the appropriate support installed, i.e. the modifications to the system files that the application requires.

Some applications have tried to address this problem by providing some form of a node install for a shared application. With this support, the user must perform a minimal install on the client prior to using the shared application. Even if the node install support is provided, this support is not satisfactory in some environments. In a restricted end-user environment, the user might not have the appropriate access to install the client node support. In a roaming user environment, when a user logs onto a client machine that has not had the application's client node support installed, the user must install this support for each machine that he or she logs onto, prior to using this application. Lastly, the end user's skills might not be satisfactory to install the node support without error.

Other solutions have been provided to try to address the problems noted above. Management software is provided that will enable an administrator to distribute software updates to the client. This approach is defined by the administrator and controlled when the updates are sent to the client. Not only does this solution require setup and planning on the system administrator's part, all client machines have the software distributed potentially at different times, based on the parameter(s) defined by the administrator. In this case, when a user roams to a machine that has not yet been updated by the administrator, the user will be unable to use the server-based application until such a time as the administrator updates that machine.

In some cases, application loaders were defined that would perform the appropriate client-side modifications upon instantiation of the application. In this case, if a reboot was necessary, large amounts of data must be transferred to the client machine. The user could potentially experience this productivity degradation for each application being launched.

Therefore, it would be advantageous to have a process and mechanism to dynamically update a Windows system with user specific application enablement support. This process would work such that when a user logs into a heterogeneous server from a Windows client, a mechanism would dynamically update the client operating system configuration to provide the necessary application enablement support for the suite of applications assigned by the system administrator. Thus, by the time the desktop program presented the user with the user's specific desktop configuration, the client would be enabled to run all assigned server-based applications.

SUMMARY OF THE INVENTION

The present invention provides a method and apparatus for updating client computers with user specific application enablement. The invention involves creating a component control file on a network server, which defines the actions to be performed to install an enablement component needed to run an application on a client and creating an installation control file which contains a list of the enablement components needed to run the set of applications that have been assigned to a user. The enablement components are changes to the operating system's configuration.

When a user logs onto a client computer, a mechanism in the client reads the user's installation control file and then installs the necessary enablement components on the client operating system, if those components are not already installed. In one embodiment, the user receives a prompt before the components are installed, in case the user does not want to use the entire set of assigned applications.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
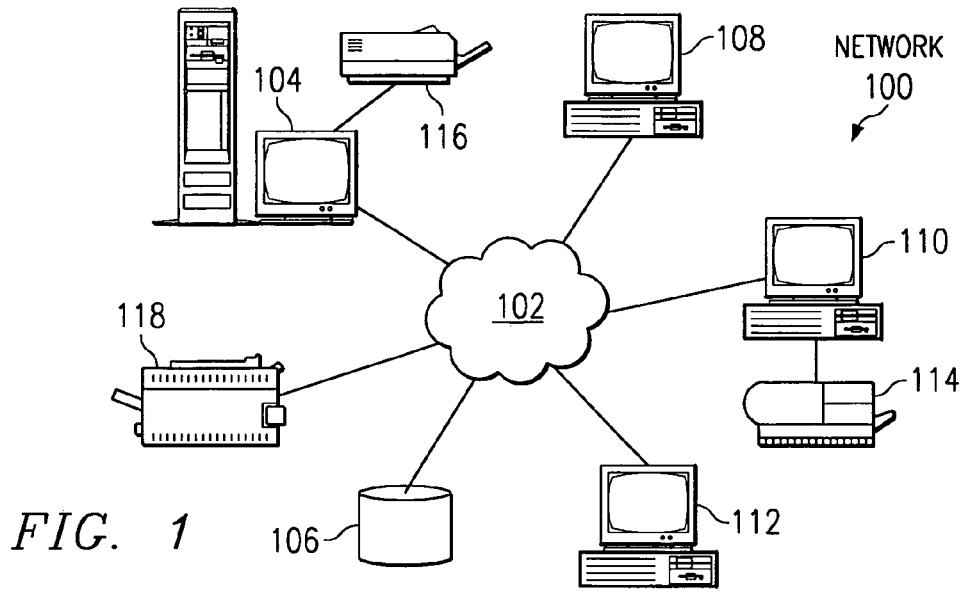
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
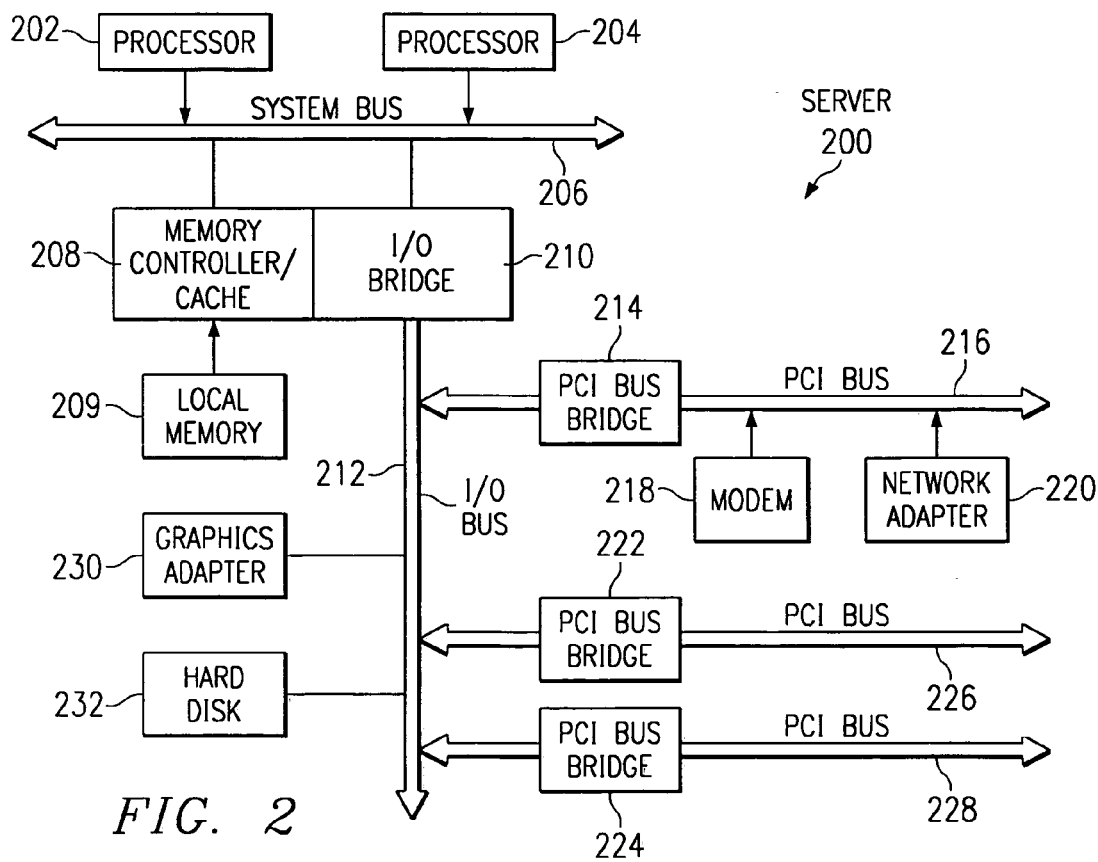
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
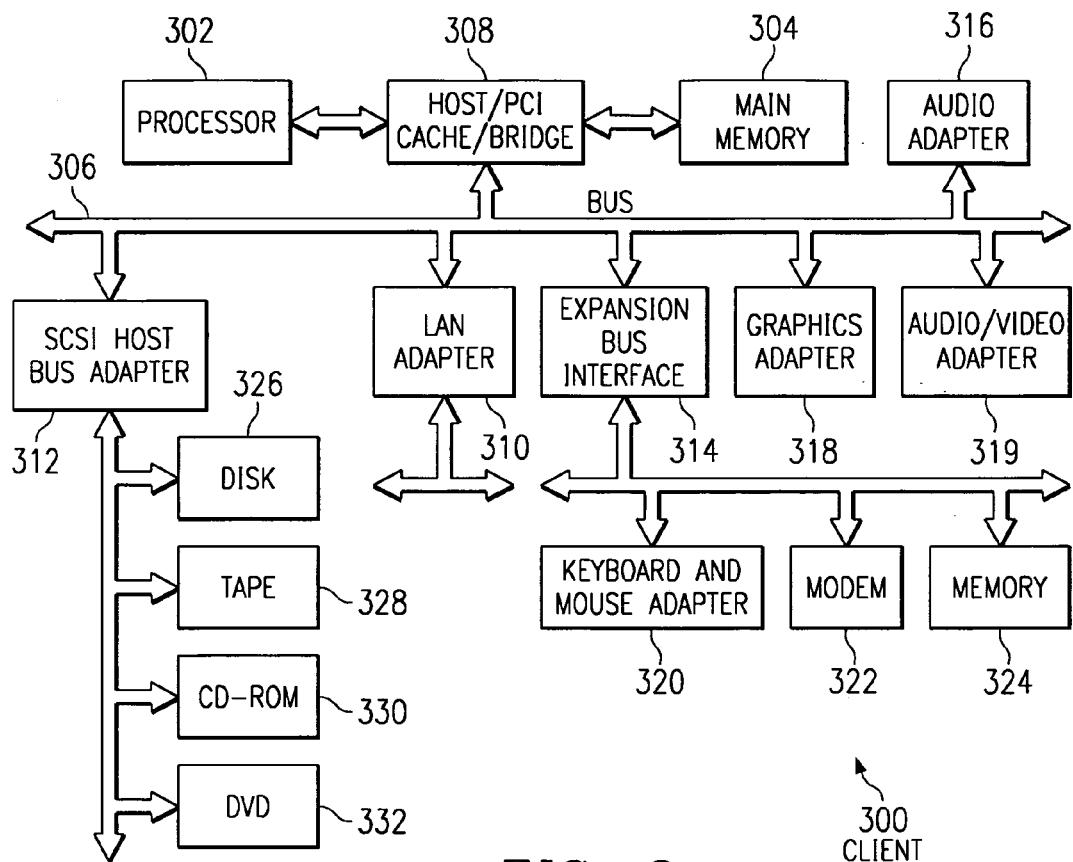
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer, including a telephony device, in addition to taking the form of a PDA. Data processing system 300 also may be a kiosk or a Web appliance.

In order for a Windows application to execute from a shared file server, in most cases, the local client operating system must be updated with some application-specific changes. Applications might require changes to the system registry that is not user-specific, HKEY_LOCAL_MACHINE, or files installed to an operating specific location, e.g. fonts.

The present invention requires that this set of changes to the Windows System, required by the application, be available on the server. Since there can be multiple types of changes (e.g. copy a file to the system image versus update the registry with a specific key), this invention defines control information to be defined for each application. Since server-based applications can be served from various server architectures (e.g. Windows, Linux, etc.), the structures defined by this invention allow for portability to the other server types and do not extend/exploit server-specific interfaces or support. This control file can be defined to handle file copies (with level checking and "in use" handling), directory copies (with level checking and "in use" handling) and registry updates (both .REG and .INF formats). This control file is defined on an application by application basis. The format of the control file can be extended to handle other system updates.

Figure 4:
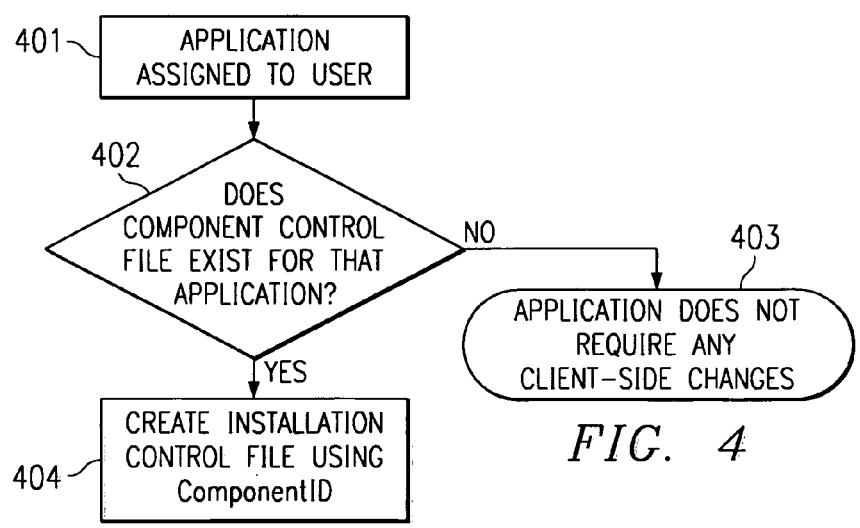
FIG. 4 depicts a flowchart illustrating the server-side process of creating application control files in accordance with the present invention.

Referring now to FIG. 4, a flowchart illustrating the server-side process of creating application control files is depicted in accordance with the present invention. Before a user can access a server-based application, the network administrator must first add the application to the user's profile area on the server (step 401). This process is further described in U.S. Patent Application entitled METHOD AND APPARATUS FOR PROVIDING CROSS-PLATFORM USER ROAMING SUPPORT IN A HETEROGENEOUS ENVIRONMENT, Ser. No. 09/714,761, which is assigned to the assignee of the present invention and is hereby incorporated herein by reference.

Next, the Server Management Support checks if a Component Control File exists for the application being added (step 402). For each server-based application, in which client operating system configuration changes are to occur dynamically for a user, a Component Control File must be defined. If a Component Control File does not exist then the application is assumed to not have any client side changes required (step 403). The design of this control file is such that it can be provided by the application vendor, written by the administrator or created automatically by a utility program. The changes to the client operating system required by an application are referred to as "components". The format of the Component Control File is as follows:

[COMPONENT_ID]
ID=COMPONENT_NAME
[INSTALL_INF_FILE]
FILEn=windows_inf_file, [inf_section]
[INSTALL_REG_FILE]
FILEn=windows_reg_file
[COPY_DIRECTORY_STRUCTURE]
DIRn=source_dir, destination_dir
[COPY_FILE]
FILEn=source_file, destination_file
[RUN]
COMMANDn=command_to_run

[COMPONENT_ID]
    This section identifies the component that the control file represents. This is usually the application name.
  [INSTALL_INF_FILE]
    This optional section specifies all the information (INF) files that need to be installed as a part of the component. Each key under this section indicates an information file to be installed.
    FILEn=windows_inf_file, where n is a number for each entry in this section
    The windows_inf_file parameter must be Universal Naming Convention (UNC) compliant or fully qualified path names to the Windows information file to be applied. If the windows_inf_file is not found, a message will be logged.
  [INSTALL_REG_FILE]
    This optional section specifies all the registry (REG) files that need to be installed as a part of the component. Each key under this section indicates a REG file to be installed.
    FILEn=windows_reg_file, where n is a unique number for each entry in this section
    The windows_reg_file parameter must be UNC compliant or fully qualified path names to the Windows registry file to be applied. If the windows_reg_file is not found, a message will be logged.
  [COPY_DIRECTORY_STRUCTURE]
    This optional section specifies all the directories that need to be copied down to the client machine as a part of the installation of the component. Each key represents a directory structure that is to be copied to the client machine.
    DIRn=source_dir, destination_dir, where n is a unique number for each entry in this section
    The client mechanism will copy all the files (hidden, system, read-only) from the source_dir to the destination_dir while preserving the directory structure of the source directory and all the subdirectories under it. The source_dir and destination_dir parameters must be UNC compliant or fully qualified path names to the file. Parameters are comma-delimited. If the source_dir or destination_dir has a comma in the filename, the parameter must be enclosed in double quotes (" "). If the source_dir or the destination_dir is not valid or accessible, a message will be logged.

[COPY_FILE]
This optional section specifies all of the files to be copied as a part of the installation of the component.
FILEn=source_file, destination_file, where n is a unique number for each entry in this section
The client mechanism will copy the file specified by the source_file to be copied to the destination_file for each key under this section. The source_file and destination_file parameters must be UNC compliant or fully qualified path names to the file. Parameters are comma-delimited. If the source_file or destination_file has a comma in the filename, the parameter must be enclosed in double quotes (" "). If the source_file or destination_file is not valid or accessible, a message will be logged.

[RUN]
This optional section specifies all the commands that need to be run by the client mechanism for the installation of the component.
COMMANDn=command_to_run, where n is a unique number for each entry in this section
The command_to_run parameter must be UNC compliant or fully qualifies path names to the executable to be run. If the command_to_run is not found, a message will be logged.

As a means of maintaining what Component Control Files a user requires, the present invention also defines a user-specific control file, the Installation Control File. This control file contains all of the components required by the set of applications that have been assigned to the user and is maintained in the user's profile area in the server. With this information, a client-side check can be performed to determine what application component(s) must be installed. To enable roaming user support, this control file is maintained on the server in a user-specific location. Thus, when a user roams between client machines, the user-specific control file is accessed to determine what components are required on the client machine that is currently being used.

The following describes the format of the Installation Control File. The format of the Installation Control File can be extended to handle other control information.

[ComponentID]
VERSION=version_number
DESCRIPTION=" "
PROMPT=YES/NO
CONTROL_FILE=control_file
  [ComponentID]
    This is a unique key specifying the component to be installed. For each application that has component information to be dynamically installed, a key must be defined. The client mechanism uses this value to compare with the installed components to determine if this component is already installed on the client machine. If the ComponentID is installed on the system, the client mechanism will check for a version of this component.
  VERSION=version_number
    Version_number is an integer number specifying the version for the component to be installed. This value is used to compare the component's version currently installed on the machine and to determine if the specified component is to be installed. If VERSION is not specified, the client mechanism will only check to see if the ComponentID has been installed.
  DESCRIPTION=" "
    This is a quoted string that will be used to describe the component to the end user. If the PROMPT=YES option is defined, this string will be presented to the end user as the component in question to be installed. If DESCRIPTION is not supplied, the ComponentID will be used in the prompt.

PROMPT=YES/NO
    This value will instruct the client mechanism whether to prompt the user to install the component. If PROMPT=YES, a prompt using the description tag, if defined, will be presented to the user for installation. If the user responds yes, the component will be installed.
  CONTROL_FILE=control_file
    CONTROL_FILE points to the application's Component Control File. If the client mechanism determines that the component should be installed, the control file specified by this keyword will be executed.

When the application is added to a specific user through some interface available to the administrator (or some other appropriate user) at the server, the Installation Control File defining the system changes is appended to contain the component information defined for this application. If an Installation Control File does not exist for the user, one is created with the ComponentID information (step 404). As applications are added to or removed from the user, the contents of this control file are modified to reflect these changes.

For persistence, the control files are maintained on the server. In case of a re-installation of the client, the next time the user logs on, the client will be updated with the user's defined changes. The client will now be able to execute the user's applications that were assigned.

Figure 5:
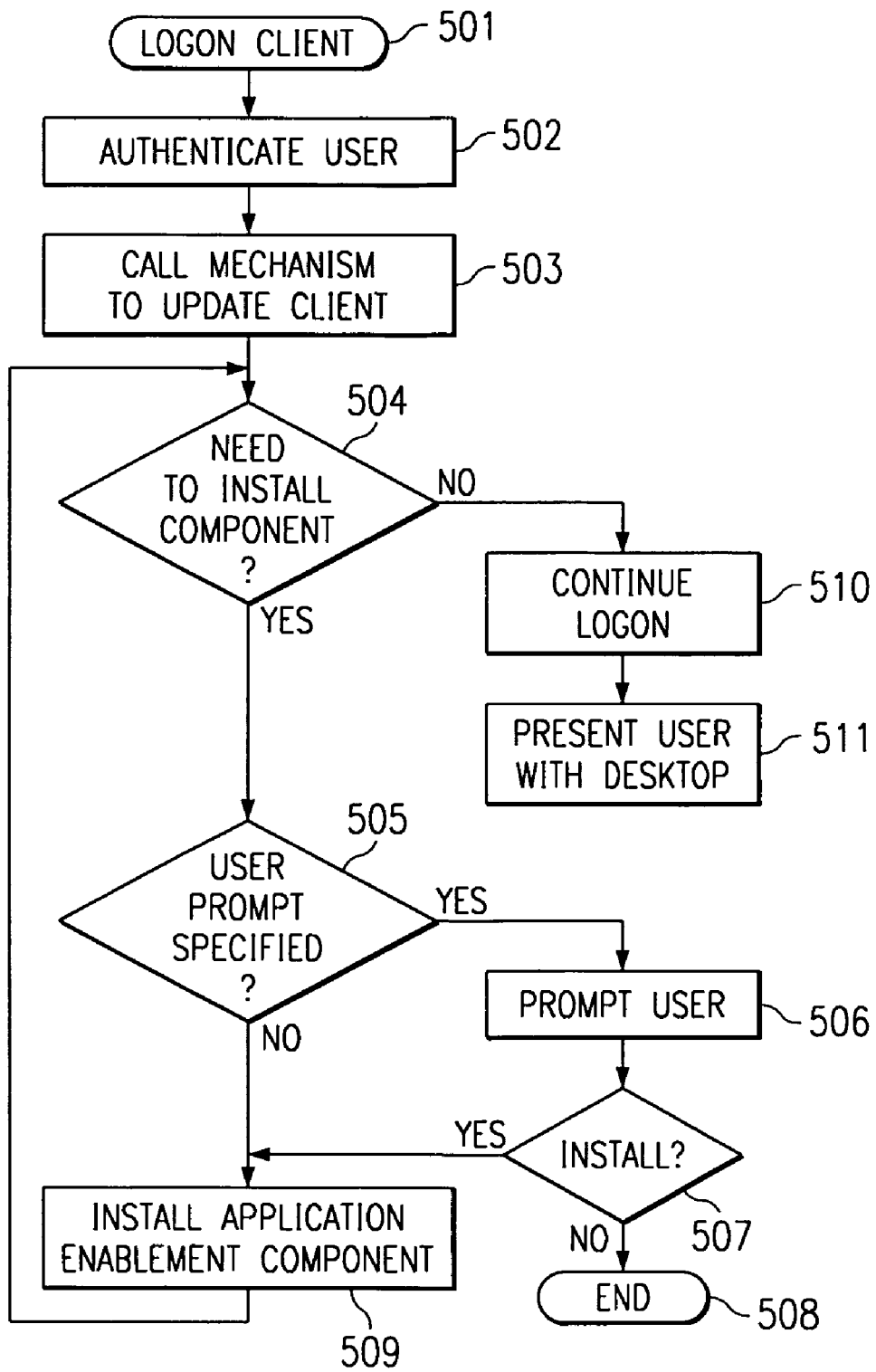
FIG. 5 depicts a flowchart illustrating the client-side process for accessing a server-based application in accordance with the present invention.

Referring now to FIG. 5, a flowchart illustrating the client-side process for accessing a server-based application is depicted in accordance with the present invention. The present invention requires a mechanism on the Windows client system that is run as part of the user authentication process. After the user logs on (step 501) and is authenticated to the server (step 502), this mechanism will process the user's Installation Control File (step 503). This control file defines the list of applications assigned to the user that have client enablement changes required. The client mechanism determines what application components are required by the user and what components are currently installed on the system that the user is currently logged in on (step 504).

If a component needs to be installed, the mechanism checks if a user prompt is specified (step 505). A mechanism to prompt the user for each application update would be provided to avoid large changes not required by the user on a specific machine. Thus, the user will not need to wait for a large update to a client where they do not plan to execute that application. For example, if a user logs onto a client to check something on the web, the user does not want to wait until the client is enabled for a complete office suite. If prompting is specified, the user will be prompted to install the necessary component (steps 506 and 507). If the user chooses not to install, the process ends and the application is not installed on the client (step 508).

If the user does choose to install the necessary component, or if user prompting is not specified, the client-side mechanism will apply the necessary changes (step 509). This process runs locally on the client and applies the changes dynamically for the user. Client updates, with version information, are maintained in the general system information portion of the client's registry. This process checks the current level of the client and applies only the changes required for the user's defined environment.

After the necessary component is installed, the mechanism returns to step 504 and repeats the process until there are no more entries. Once all necessary components for the loaded applications are installed, the client continues the logon process (step 510). Since some system changes require a re-boot to take effect, this agent will determine the state and dynamically reboot the client if required (after all updates are applied). Upon completion, the user will be able to execute the applications on the client where they just authenticated (step 511).

The following provides a more technical description of the Installation Control processing flow:

```
Clear the reboot key
Open the user's Installation Control File
while (Get the next componentID)
{
    Check if the componentID is installed on the
        client
    if (componentID is installed)
    {
        Get the VERSION value from the control
            file
        Check if the VERSION installed is <
            VERSION value from the control file
        if (controlfileVERSION > installedVERSION)
        {
            // This ComponentID has not been
                installed on this machine,
            // so it needs to be installed
                needInstall = true
        }
    }
    else // do not need to check version because
        the componentID has never been installed
    {
        needInstall = true
    }
    if (needInstall)
    {
        // NOTE: need to prompt the user to see if
            he/she wants to install this
            component if prompt setting is true.
            Get the CONTROL_FILE value from the
            Installation Control File
        If (CONTROL_FILE value is NULL)
        {
            // this means install directives will
                be local to this file
        }
        else // install tags are in a separate
            script file
        {
            Open the file reference by
                CONTROL_FILE to read
            Go to the componentID section to
                begin execution of tags
        }
        Process the install tags in the following
            order
        [COPY_DIRECTORY_STRUCTURE]
        [COPY_FILE]
        [INSTALL_INF_FILE]
        [INSTALL_REG_FILE]
        [RUN]
        Log successes and failure of each install
            tag
        if (all tags were installed successfully)
        {
            set the componentID/Version registry
                key
        }
    }
    Else // correct version is on system
        {}
} // end while (Get next componentID)
// all new components should now be installed
if (a reboot requirement was detected for any of the
    components)
{
    set a registry key indicating a reboot need was
        detected
    let user know reboot is required
    reboot the system
}
Copyright © 2000 IBM.
```

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for updating client computers with user specific application enablement, comprising:

creating, at a server, a component control file which defines enablement components needed to run applications from the server assigned to a user on a client and actions to be performed to install the enablement components, wherein the enablement components comprise required changes to an operating system of the client;

creating, at a server, an installation control file which lists the applications that have been assigned to the user and the enablement components from the component control file which must be installed in order to execute the applications that have been assigned to the user on the client;

determining, at the client, if the enablement components for applications listed in the installation control file are currently installed on the client; and if the enablement components for the applications listed in the installation control file are not currently installed on the client, installing, at the client, the enablement components for the applications listed in the installation control file on the client.

2. The method according to claim 1, wherein the component control file and the installation control file are stored in a server.

3. The method according to claim 1, further comprising:
if the enablement components for the applications listed in the installation control file are currently installed on the client, determining if versions of the enablement components for the applications listed in the installation control file are later than versions of the enablement components currently installed on the client; and if versions of the enablement components for the applications listed in the installation control file are later than versions of the enablement components currently installed on the client, installing enablement components for the applications listed in the installation control file on the client.

4. The method according to claim 3, wherein the installation control file is stored in a user-specific profile area in the server.

5. The method of claim 1, wherein the required changes to an operating system of the client include an application name assigned to the user, information files required to be installed on the client, registry files required to be installed on the client, directories required to be copied to the client, files required to be copied to the client, and commands required to be run on to client.

6. A method for updating client computers with user specific application enablement, comprising:
responsive to a request for updating a client, reading, at the client, a user's installation control file from a server which contains a list of enablement components needed to run a set of applications from the server that have been assigned to the user of a client;

determining, at the client, if each of the list of enablement components is installed on the client; and changing, at the client, an operating system of the client to install each of the list of enablement components that is not installed on the client.

7. The method according to claim 6, wherein the installation control file is stored in a server.

8. The method according to claim 6, wherein the installation control file is stored in a user-specific profile in the server.

9. The method according to claim 6, further comprising prompting the user before installing the enablement components.

10. The method of claim 6, wherein the step of changing an operating system of the client comprises:
installing required information flies on the client;
installing required registry files on the client;
copying required directories to the client;
copying required files to the client; and
running required comments on the client.

11. A computer program product in a computer readable medium for use in a data processing system for updating client computers with user specific application enablement, comprising:
instructions for creating, at a server, a component control file which defines enablement components needed to run applications from the server assigned to a user on a client and actions to be performed to install the enablement components, wherein the enablement components comprise required changes to an operating system at the client;

instructions for creating, at the server, an installation control file which lists the applications that have been assigned to the user and the enablement components from the component control file which must be installed in order to execute the applications that have been assigned to the user;

instructions for determining, at the client, if the enablement components for the applications listed in the installation control file are currently installed on the client; and instructions for installing, at the client, the enablement components for the applications listed in the installation control file on the client if the enablement components for the applications listed in the installation control file are not currently installed on the client.

12. The computer program product according to claim 11, wherein the component control file and installation control file are stored on a server.

13. The computer program product according to claim 11, further comprising:
if the enablement components for the applications listed in the installation control file are currently installed on the client, determining if versions of the enablement components for the applications listed in the installation control file are later than versions of the enablement components currently installed on the client; and if versions of the enablement components for the applications listed in the installation control file are later than versions of the enablement components currently installed on the client, installing the enablement components for the applications listed in the installation control file on the client.

14. The computer program product according to claim 13, wherein the installation control file is stored in a user-specific profile area in the server.

15. The computer program product of claim 11, wherein the required changes to an operating system of the client include an application name assigned to the user, information files required to be installed on the client, registry files required to be installed on the client, directories required to be copied to the client, files required to be copied to the client, and commands required to be run on the client.

16. A computer program product in a computer readable medium for use in a data processing system for updating client computers with user specific application enablement, comprising:
instructions for reading, at a client, a user's installation control file from a server which contains a list of enablement components needed to run a set of applications from the server that have been assigned to the user of a client, responsive to a request for updating the client;

instructions for determining, at the client, if each of the list of enablement components is installed on the client; and instructions for changing, at the client, an operating system of the client to install each of the list of enablement components that is not installed on the client.

17. The computer program product according to claim 16, wherein the installation control file is stored on a server.

18. The computer program product according to claim 16, wherein the installation control file is stored in a user-specific profile area in the server.

19. The computer program product according to claim 16, further comprising instructions for prompting the user before installing the enablement components.

20. The computer program product of claim 16, wherein the instructions for changing an operating system of the client comprises:

instructions for installing required information files on the client;

instructions for installing required registry files on the client;

instructions for copying required directories to the client;

instructions for copying required files to the client; and instructions for running required comments on the client.

21. A system having means for updating client computers with user specific application enablement, comprising:

means for creating, at a server, a component control file which defines enablement components needed to run applications from the server on a client and the actions to be performed to install the enablement components, wherein the enablement components comprise required changes to an operating system of the client;

means for creating, at the server, an installation control file which lists the applications that have been assigned to a user and the enablement components from the component control file which must be installed in order to execute the applications that have been assigned to the user on the client;

means for determining, at the client, if the enablement components for applications listed in the installation control file are currently installed on the client; and if the enablement components for the applications listed in the installation control file are not currently installed on the client, installing, at the client, the enablement components for the applications listed in the installation control file on the client.

22. A system having means for updating client computers with user specific application enablement, comprising:

means for reading, at a client, a user's installation control file from a server which contains a list of the enablement components needed to run a set of applications from the server that have been assigned to the user, responsive to a request for updating the client;

means for determining, at the client, if each of the list of enablement components is installed on the client; and means for changing, at the client, an operating system of the client to install each of the list of enablement components that is not installed on the client.

\* \* \* \* \*